United States Patent [19]
Jones et al.

[11] Patent Number: 5,497,633
[45] Date of Patent: Mar. 12, 1996

[54] EVAPORATIVE COOLING UNIT

[75] Inventors: Michael Jones; Mark Hensley, both of Culver City, Calif.

[73] Assignee: Cool Zone Products & Promotions, Inc., Los Angeles, Calif.

[21] Appl. No.: 261,474

[22] Filed: Jun. 17, 1994

[51] Int. Cl.$^6$ ............................................. F28D 5/00
[52] U.S. Cl. ..................... 62/314; 62/259.4; 239/290
[58] Field of Search ........................ 239/290; 62/121, 62/259.4, 314, 304; 52/2.21, 2.18, 302.5; 135/91, 93, 16, 33.7, 911; 454/1

[56] References Cited

U.S. PATENT DOCUMENTS

| | | | |
|---|---|---|---|
| 4,478,767 | 10/1984 | Watanabe et al. | 62/314 |
| 5,349,829 | 9/1994 | Tsimerman | 62/314 |

FOREIGN PATENT DOCUMENTS

| | | | |
|---|---|---|---|
| 0145623 | 6/1985 | European Pat. Off. | 52/2.18 |

Primary Examiner—Henry A. Bennett
Assistant Examiner—Susanne C. Tinker
Attorney, Agent, or Firm—Eckert Seamans Cherin & Mellott

[57] ABSTRACT

A portable indoor and outdoor evaporative cooling unit includes a conduit structure with an inlet and outlet, an air blower, and a plurality of nozzles for emitting water or other evaporating coolant into the air flow. The nozzles connect to a source of water or the like and are positioned in or on the conduit such that sprayed coolant mixes together with the forced air to form a mixture whose temperature drops via evaporative cooling. The outlet directs the mixture in streams or clouds where persons can immerse themselves or walk through to cool down. Alternative embodiments include an inverted L-shape, a tower and a framework forming a pavilion. One or more porous membranes can be placed along the flow path, particularly at the outlet, with at least one nozzle arranged to soak the membrane. As used at the outlet, the membrane forms a flow restriction for maintaining inflation. The cooling unit is advantageously used for cooling athletes at competitions, fire fighters and the like.

17 Claims, 6 Drawing Sheets

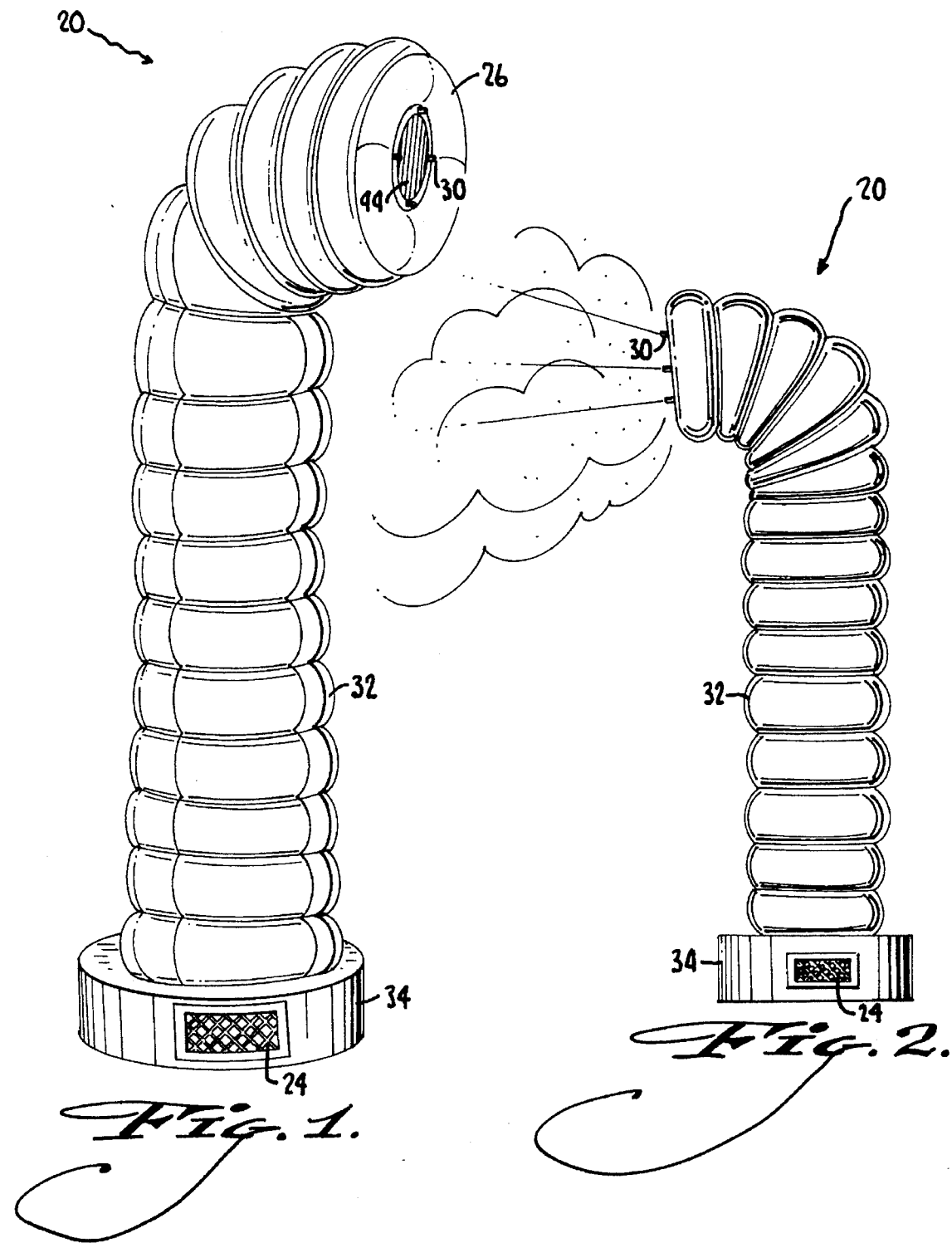

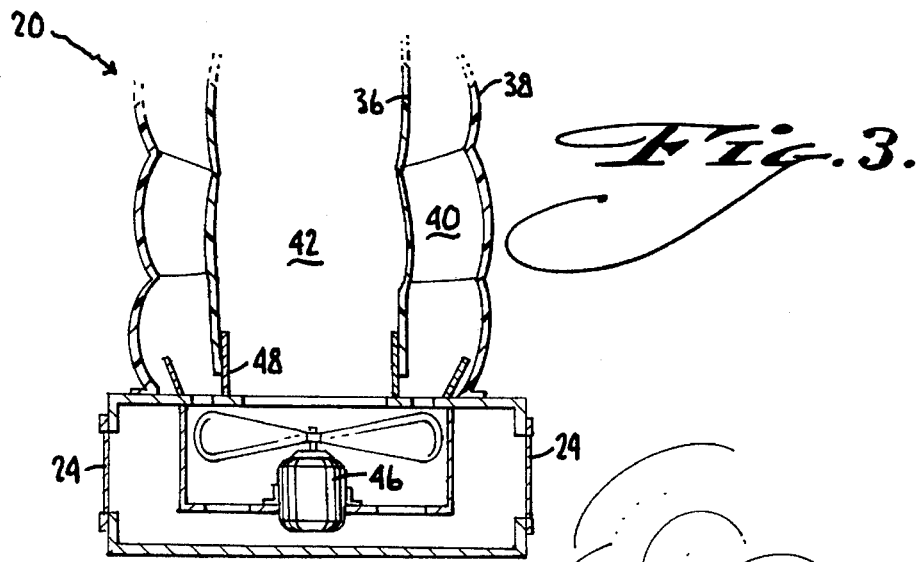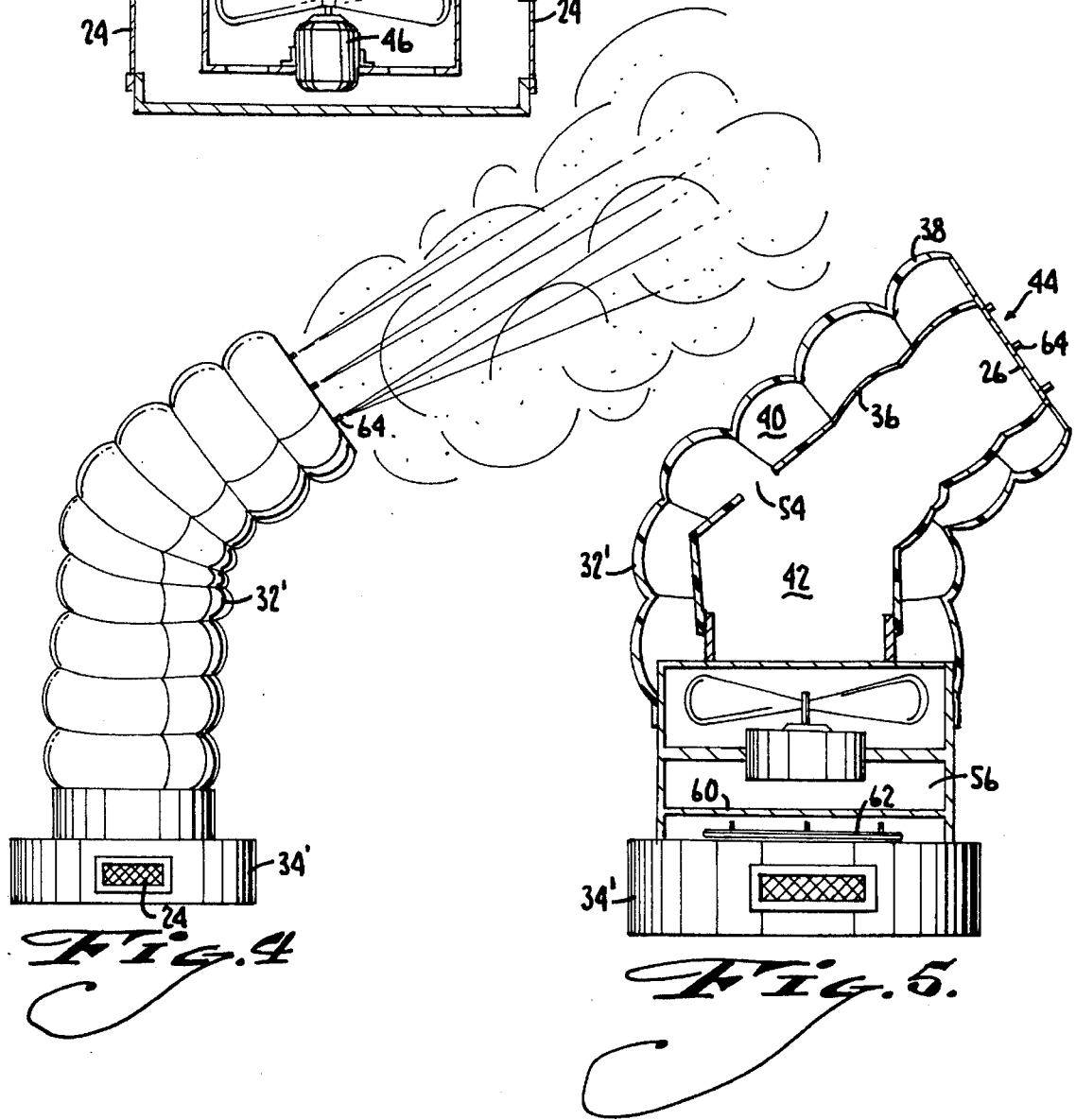

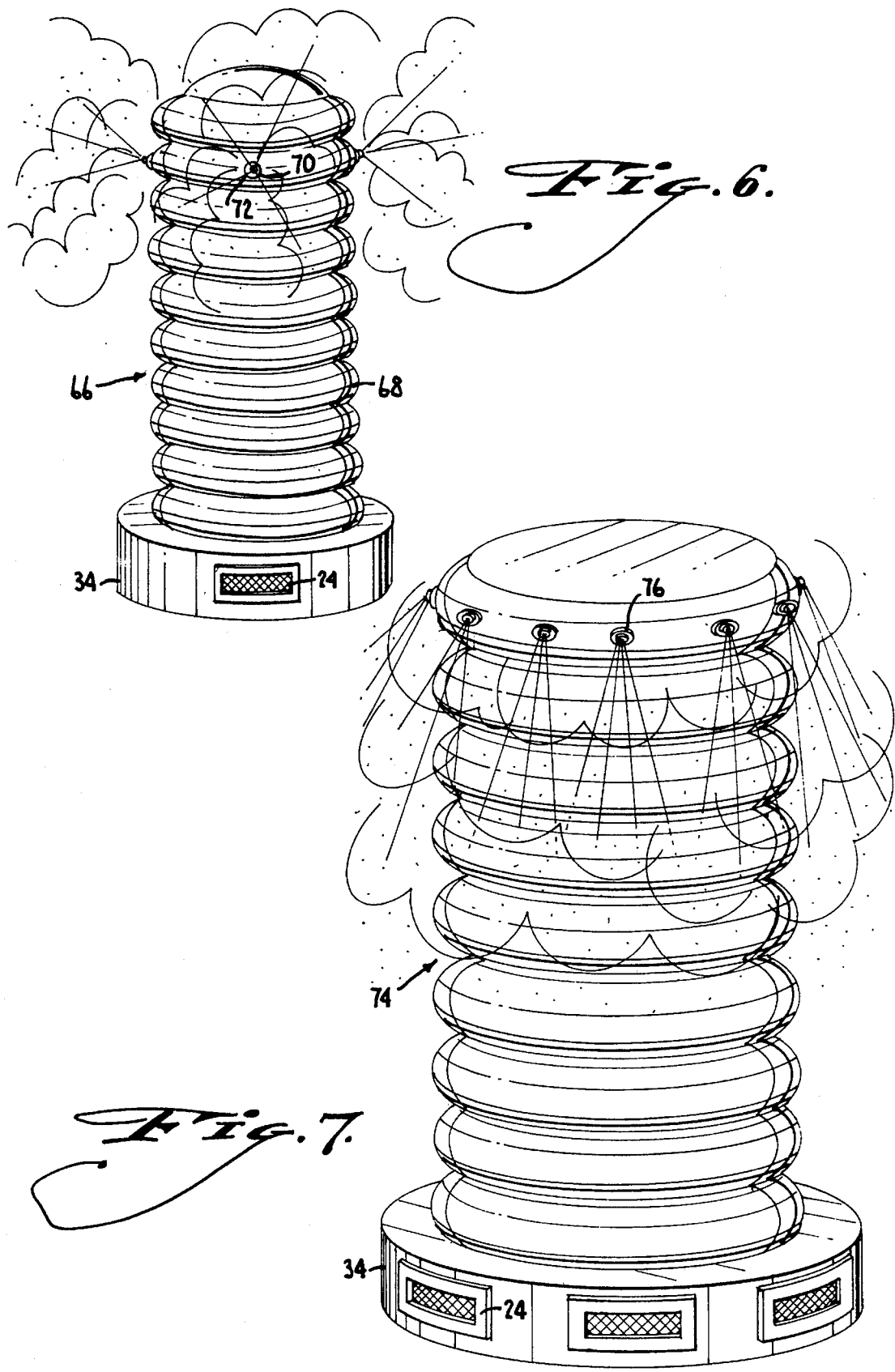

EVAPORATIVE COOLING UNIT

BACKGROUND OF THE INVENTION

1. Field of the Invention

The invention relates to air circulating and cooling devices, and in particular concerns an air circulating and cooling device with a spray means, suitable for both indoor and outdoor use to service multiple users on a walk-by basis such as athletes in competition or practice, fire-fighters while fire-fighting, spectators of outdoor summertime events and the like.

2. Prior Art

Heat stress challenges the enjoyment and/or health of persons engaged in activities such as athletic exercise, or even spectators athletic exercise by others, especially while outdoors in the summer. Fire-fighters are likewise exposed to heat stress, on the job, which may be even more extreme.

It is known to ease heat stress on an athlete, spectator, fire-fighter or the like by providing circulating air and/or shade means. More complicated solutions, such as circulating refrigerated air, are generally not favored because a unit of sufficient capacity to provide meaningful relief in an open outdoor space would be prohibitively expensive, would require a team of workers to move, set up, operate and maintain, and would require some means to vent the warm side of the cooling device. Numerous smaller units might be deployed, but this simply multiplies the problems. In general, it is a shortcoming of known outdoor cooling devices that they are expensive to acquire and/or use, and inconvenient to transport and/or store.

SUMMARY OF THE INVENTION

It is an object of the invention to provide a portable indoor and outdoor cooling unit for athletes, fire-fighters, spectators and so on, that uses a non-refrigerated coolant such as plain water or the like to provide an evaporative cooling means, the water being atomized in the air.

It is another object of the invention to make the above portable indoor and outdoor evaporative cooling unit inflatable via flexible walls forming a partially sealed enclosure so that the unit is more conveniently portable when deflated.

It is an additional object of the invention to provide such an inflatable evaporative cooling unit with a built-in fan to force air into the enclosure for inflating it.

These and other aspects and objects are provided according to the invention in a portable evaporative cooling unit that optionally can take the form of an inflatable conduit or pipe with inner and outer walls of thin flexible material. The inner and outer walls cooperatively define an enclosure. The inner wall defines a chamber with an outlet, which chamber is substantially enveloped by the enclosure.

A fan forces ambient air from an inlet through a flow divider, which directs some of the flow into the enclosure and the rest of the flow into the chamber to exhaust through the outlet. Spray nozzles are attachable to the enclosure and aimed to spray coolant, such as water, into the air exhausting through the outlet. The water can be drawn from a tap to public-utility water, but if necessary can be boosted to high pressure by a booster pump or the like.

The sprayed water and forced air mix together which results in a cooling mixture having a temperature lower than the initial temperature of either the tap water or the ambient air via the process of evaporative cooling. This cool mixture is driven in a defined pattern by the outlet in either a cloud or a stream, either of which is arranged to exhaust where persons can immerse themselves to cool down.

It is an optional inventive aspect to include a soaked porous membrane which enhances the effects of evaporative cooling. In practice, the conduit includes an intake port through which the fan draws in ambient air. The conduit further additionally includes an entrance portion between the intake and the blower in which the porous membrane is stretched out. A sprinkling system connected to the water source is mounted adjacent to the entrance portion and is directed onto the porous membrane to soak the porous membrane continuously with water. By this arrangement, the effects of evaporative cooling are enhanced.

The inner wall is preferably formed with apertures arranged to allow air to escape from the enclosure into the chamber. The apertures are sized for metering the escaping air to maintain positive pressure in the enclosure and thereby to keep the inflatable conduit inflated.

The nozzles and outlet can be arranged in different ways to achieve different shapes in the exhaust. For example, the chamber can be provided with multiple outlets and nozzles cooperatively arranged in nozzle and outlet pairs such that the nozzle of each pair is mounted in a middle of the outlet of the pair. In this arrangement, the exhaust and spray mixture is discharged in the shape of a cloud or the like in which persons can immerse themselves. For another example, the nozzles are arranged at spaced locations in a plane common with a single, relatively large outlet. By this arrangement, the exhaust and spray mixture define the shape of a billowing stream which can be aimed up, at an incline, horizontally or downwardly, so that persons can walk through or under the point of discharge to immerse themselves and to cool down.

The cooling unit is deflatable for easy portability between different sites, whereby the cooling unit can be used by athletes in competitions and practices, by firefighters during their official duties, by spectators or attenders of outdoor summertime events, etc.

According to another inventive aspect the cooling unit can be arranged to form a pavilion. The pavilion arrangement includes three or four leg segments (although any number is possible) and several overhead segments arranged in a framework. The overhead segments preferably have lower portions in which a plurality of outlets are defined. The segments can be formed in the double wall configuration described above, or even more simply of a single wall configuration in which the fan inflates just the enclosure defined by the single wall.

The nozzles can be arranged in different ways to accomplish different shapes in the exhaust. For example, the nozzles can be mounted in spaced positions within the segments, also being spaced away from the outlets. Among other things, this mounting enhances the mixing of air and water and maximizes evaporative cooling. This mounting also permits the outlets to be covered with porous membranes.

The porous membranes have two main advantages. The porous membranes are sized and arranged for metering the exhausting mixture which escapes from the enclosure to maintain the pavilion or other structure inflated. Additionally, the porous membranes exhaust the air and coolant mixture in the shape of a diffuse cloud which can be directed onto persons, for example, standing under the pavilion.

Another arrangement of the nozzles couples the nozzles with multiple, discrete outlets, the nozzles and outlets being cooperatively arranged in nozzle and outlet pairs such that the nozzle of each pair is mounted in a middle of the outlet of the pair. This arrangement likewise discharges in the shape of a cloud which can be directed onto the persons.

In an alternative embodiment, the portable evaporative cooling unit is arranged to define an inflatable tower which is easily portable in that it collapses longitudinally when deflated. The tower carries a plurality of nozzles attached high up on the tower in positions and directions such that the nozzles rain down the evaporative coolant, such as water, on persons who are immersing themselves in these showers to cool down.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a portable indoor and outdoor evaporative cooling unit according to the invention, with an inflatable housing;

FIG. 2 is a side elevational view thereof;

FIG. 3 is an enlarged partial section view, partly broken away, taken through the base portion of the embodiment of FIG. 2;

FIG. 4 is a perspective view of an alternative embodiment of the invention, with an inflatable housing exhausting a stream of mist and/or spray at an incline;

FIG. 5 is an enlarged partial section view, partly broken away, of the embodiment of FIG. 4;

FIG. 6 is a perspective view of another embodiment of the invention, with an inflatable vertical tower having sides carrying outwardly-directed nozzles;

FIG. 7 is a perspective view of a further embodiment of the invention, with an inflatable vertical column having a rim carrying outwardly and downwardly directed nozzles;

DETAILED DESCRIPTION OF THE PREFERRED EMBODIMENTS

Figure 8:
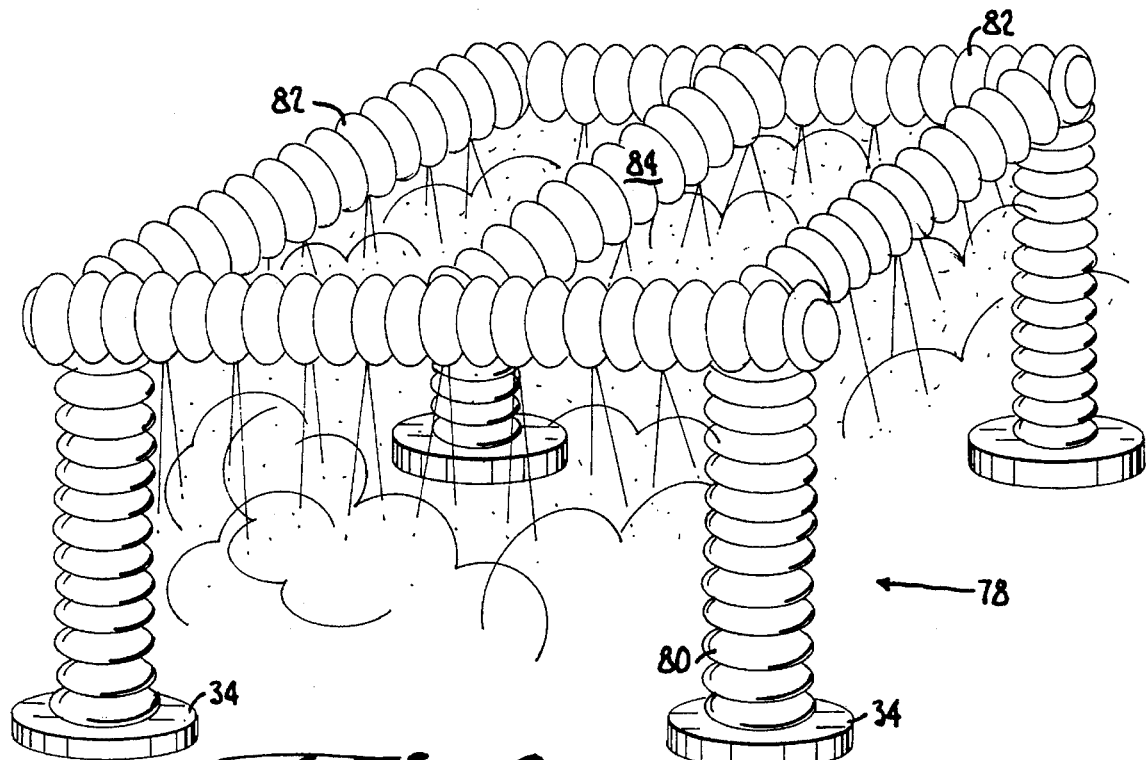
FIG. 8 is a perspective view of an additional embodiment of the invention, with an inflatable pavilion having overhead beams exhausting downwardly-directed evaporative-cooled air.

FIGS. 1–3 show a portable indoor and outdoor evaporative cooling unit 20 according to the invention, which uses evaporative cooling to drop the temperature in the ambient air (i.e., the local atmosphere surrounding the cooling unit, which may be a local indoor atmosphere or an outdoor one). The cooling unit 20 operates by drawing in a steady flow of relatively warmer ambient air through an intake 24, and exhausting the drawn in air through a ring 26 of nozzles 30 spraying a relatively warmer coolant such as tap water into the exhaust stream. The air and liquid coolant mix together and due to evaporation, both the air and the water are cooled relative to their initial temperature. The mixture is directed onto the persons to be cooled, and insofar as droplets of coolant are sprayed onto the persons, further evaporative cooling is achieved.

The cooling unit 20 comprises an inflatable structure 32 which deflates (not shown) for convenient portability between uses or for storage during non-use, and is inflated for use. The embodiment shown in FIGS. 1 and 2, for example, has a series of annular segments, enabling the structure to collapse along its longitudinal axis when deflated.

Cooling unit 20 is advantageously used for athletic events or practices, on athletes and/or spectators, on fire-fighters during fire-fighting, and other attendees or spectators involved in activities likely to cause heat stress. Typically unit 20 is used outdoors, although an indoor use is also possible. The inflatable structure 32 is shown inflated in the Figures, and is disposed standing upright on a base 34 that provides some ballast and stability.

Inflatable structure 32 in FIGS. 1–3 (and 4–5) has a double wall arrangement, comprising an inner wall 36, and an outer wall 38 surrounding the inner wall. The inner and outer walls 36 and 38 cooperatively define a relatively sealed enclosure 40. The inner wall 36 further defines a conduit with chamber 42 leading from an inlet at the base to an outlet 44, and this chamber 42 is substantially surrounded by the enclosure 40. Walls 36 and 38 are formed of a thin flexible material such as a pliable resinous material, sealed canvas or the like.

Inflatable structure 32 is kept inflated via a fan 46 mounted in base 34. Fan 46 is electric and can operate on conventional line voltage. Fan 46 has blades which turn within a housing that leads to a flow divider 48. Fan 46 operates continuously in use, and draws ambient air in through one or more inlets or intakes 24 in base 34. The fan forces air through the housing and to flow divider 48. Flow divider 48 can have a ring shape. Air that flows through the center of the ring is directed to chamber 42; and air that flows outside the ring is directed to enclosure 40.

The air forced into enclosure 40 inflates enclosure 40 and thereby induces structure 32 to stand upright in the inflated shape shown in the Figures. The air forced into the enclosure 40 is vented in a controlled or restricted manner through a series of apertures 54 (see FIG. 5) between enclosure 40 and chamber 42. Apertures 54 form flow restrictions that meter the escape of air from enclosure 40 for maintaining the desired pressure difference between the enclosure 40 and the ambient air. This keeps structure 32 inflated, so long as the fan is on, and causes structure 32 to stand stably on base 34.

The forced air is discharged from enclosure 40 and/or chamber 42 at an outlet 44 in the end of structure 32. The flow rate of the forced air preferably is considerable, such that at least nearby the structure the discharge forms a defined stream. An inventive aspect includes the mounting of spray nozzles 30 in the plane of the outlet 44 for emitting water into the flow. In the embodiment shown, four nozzles 30 are interconnected by a ring manifold 26 which is supplied pressurized water or other coolant by suitable, preferably flexible flow connections and a pump (not shown).

Nozzles 30 are spaced from one another, for example in an array in which the nozzles are opposite one another around ring 26. Manifold 26 and spray nozzles 30 can be removably attachable to inflatable structure 32, such that they can be detached from structure 32 upon deflation, for transportation and/or storage.

The preferred coolant is simply water. Filtered tap water can be provided and pressurized through a booster pump. A high pressure pump is advantageous to obtain better atomization of the coolant immediately adjacent to the point of exit through nozzles 32. As a result, evaporative cooling is enhanced because atomized coolant vaporizes in the air more quickly than larger droplets. The drawbacks of high pressure atomization include the relatively smaller orifice size in nozzles 30, which may become clogged by suspended particles in the coolant, by accumulation of lime or the like. These problems can be minimized by filtration and/or water treatment. The advantages of the invention also can be accomplished with water from a domestic supply, typically at 40 to 60 psi. With a pump and/or booster, the pressure may be raised to 1400 psi or more.

The spray nozzles 32 are oriented to spray the coolant, such as tap-water, into the air discharged through outlet 44. The water is presumed to be at or below ambient temperature, but could be lukewarm and still be cooled by evaporation. Due to evaporative cooling, the advantages of the invention are achieved without the expense and complexity of refrigeration of the air or water. The coolant mixes with the stream of exhausting air, during which part or most of the liquid coolant preferably changes into vapor. The resultant mixture is cooler in temperature than the coolant or ambient air because of the evaporative cooling process. The mixture is also of course more humid than the ambient air, but is refreshing to persons nonetheless.

The cooled air/water mixture flows turbulently from outlet 44, preferably in a relatively defined stream. Inflatable structure 32 is shaped and sized so that the stream passes wherein persons can immerse themselves to cool down out. A preferred location for structure 32 is behind the benches on the sidelines of an athletic event such as a football game or practice to cool down the athletes between plays.

With a given extent of mixing of the air and water, the actual temperature achieved by evaporative cooling varies with the initial dryness of the ambient air. For example, given dry warm air at 95° F. (35° C.) and 20 percent relative humidity, atomizing even ambient temperature water therein can drop the temperature of the mixture to as low as 66° F. (19° C.). However, if the same ambient air at 95° F. has a relative humidity of 50 percent, then atomizing the water only drops the temperature of the mixture to about 80° F. (27° C.). Frequently, with tap water from the domestic supply, the water will be relatively cool after flowing for a time, which of course makes the mixture cooler than warmer water.

The evaporative temperature change results from extracting heat energy from the air and using the energy to change the phase of the water from liquid to vapor. Thus the temperature change is achieved without the introduction of external refrigeration power, unlike cooling systems which extract heat in the component(s). There is no need with the invention to discharge waste heat elsewhere, because apart from energy expended to induce flow, the balance of energy added or subtracted is zero. The latent heat energy expended in vaporization is drawn from the warm air, which accounts for the temperature drop.

An additional inventive aspect is shown in FIGS. 4–5, concerning an embodiment that provides for enhanced atomization of the coolant in the air. The structural elements in FIGS. 4–5 are generally the same as in FIG. 1–3, excluding the overall shape of the inflatable structure 32' in an inverted-L, except that the base 34' includes the following differences. Between the intake port 24 and the fan 46, there is an enlarged entrant portion 56. The entrant portion 56 is substantially obstructed by a porous diaphragm or membrane 60 at a position between the intake 24 and the fan 46. A sprinkling system 62 is mounted adjacent the membrane 60 and is connected to the water source. The sprinkling system 62 is mounted to continually soak the porous membrane 60 with coolant. The air that is drawn in by the fan 46 must migrate through the porous membrane 60, and while doing so, loads up with fine droplets and/or vapor of the coolant. By this arrangement, the effects of evaporative cooling are enhanced. One or more wetted porous membranes can be placed across all or part of the flow path at various points along the structure.

In FIG. 4, nozzles 64 at the outlet have orifices (not shown) sized for producing large jets of water. The combined effects of the enhanced evaporative cooling in the entrant portion with large jets of these nozzles 64 cooperatively produce a drenching cooling experience for persons immersing themselves in the discharge. This embodiment is particularly useful for fire-fighters during fire-fighting. Fire-fighters are subject to substantial problems with heat and normally have no concerns about being drenched.

FIG. 6 illustrates an alternative inventive aspect wherein inflatable structure 66 is formed of a single flexible wall 68 defining an enclosure (not shown) ventilated with a plurality of outlets 70. Outlets 70 are combined with corresponding nozzles 72 in nozzle and outlet pairs. The nozzle 72 of each pair is mounted in a middle of the outlet 70 of the pair. A fan (not shown) in the base 34 forces air to pressurize the enclosure, and inflate wall 68. The air is vented via flow restricting outlets 70. In this arrangement, the discharged air from each outlet 70 mixes with the sprayed coolant of one nozzle 72, and the combined effect of the multiple nozzle and outlet pairs produces a defined pattern or shape of a billowing exhaust in the form of a cloud or the like in which persons can immerse themselves to cool down.

In FIG. 7, another embodiment of the portable evaporative cooling unit is arranged to define an inflatable tower 74. The tower 74 resembles an enlarged soda or beer can and can be suitably decorated with an advertisement or logo, for use in sporting events and the like. Tower 74 has a plurality of nozzles 76 attached at the upper periphery, spaced and oriented such that nozzles 74 shower or rain down water on persons walking close by.

FIGS. 8–11 show a further inventive aspect wherein the inflatable structure is shaped to resemble a pavilion 78. Pavilion 78 comprises several segments 80–84 formed in the single wall configuration of FIG. 6–7, all inflatable by a common fan or blower (not shown). Pavilion 78 comprises four leg segments 80 and five overhead segments 82 and 84, arranged in a framework. The four side overhead segments 82 have lower portions provided with a plurality of outlets 86.

The outlets 86 can be arranged in different ways to accomplish different shaped discharges. For example, outlets 86 can be paired with nozzles 88 at spaced positions on the side overhead segments 82 and adjacent to the outlets 86. The nozzle 88 of each nozzle and outlet pair is mounted in a middle of the outlet 86 of the pair. By this arrangement, the air and spray exhaust defines a cloud which sinks onto persons standing under pavilion 78.

Figure 9A:
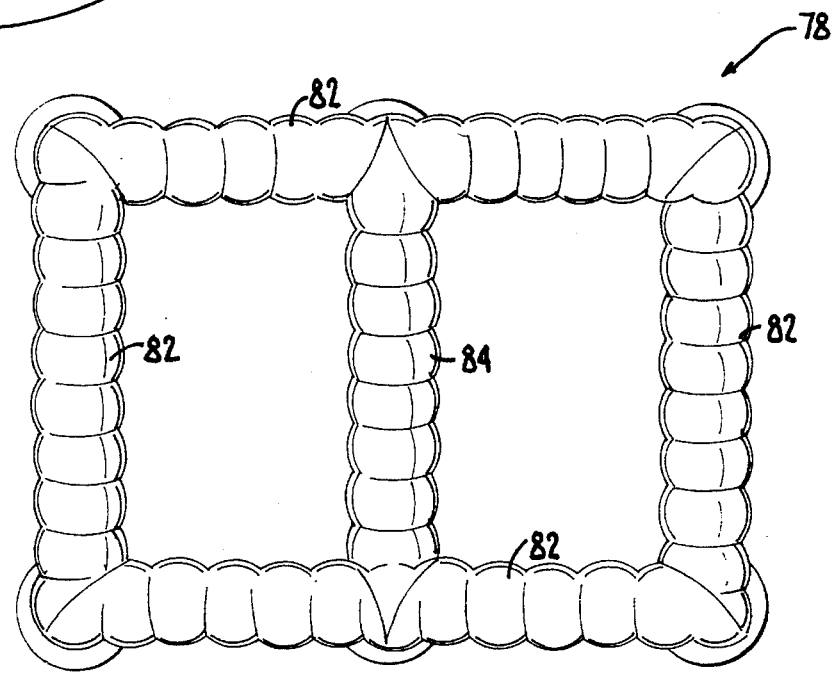
FIG. 9a is a top plan view thereof.
Figure 9B:
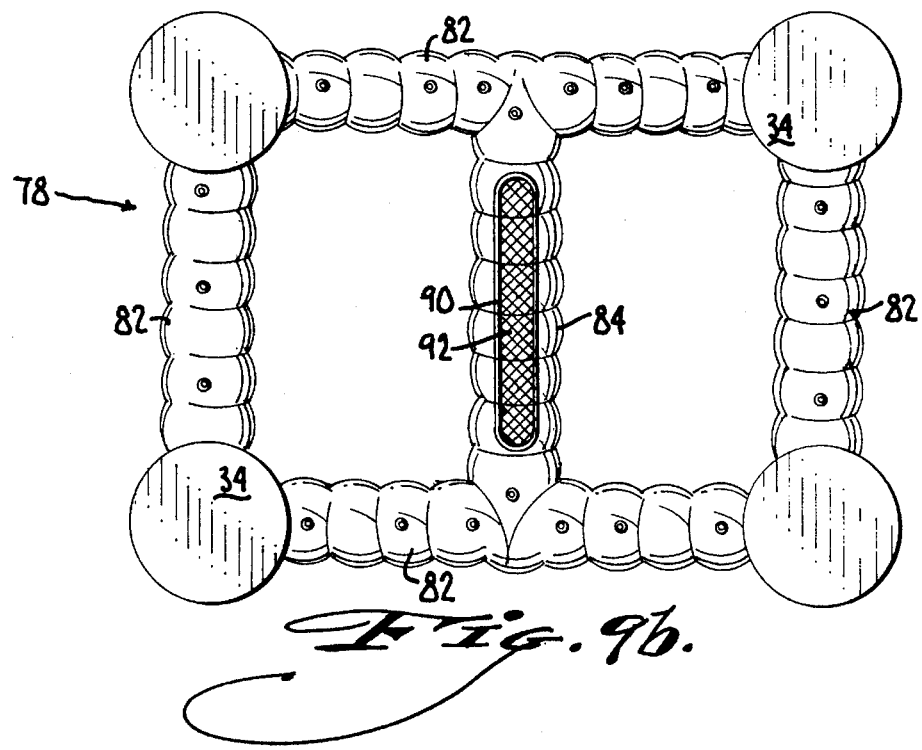
FIG. 9b is a bottom plan view thereof.
Figure 10:
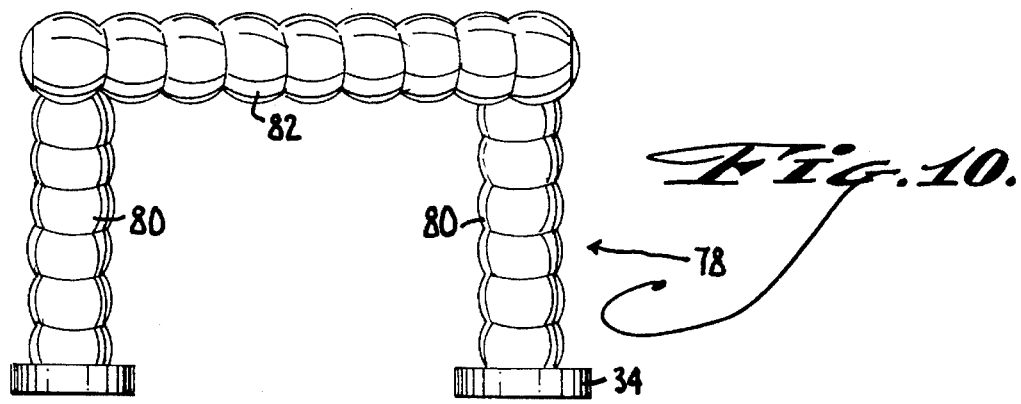
FIG. 10 is a side elevational view thereof.
Figure 11:
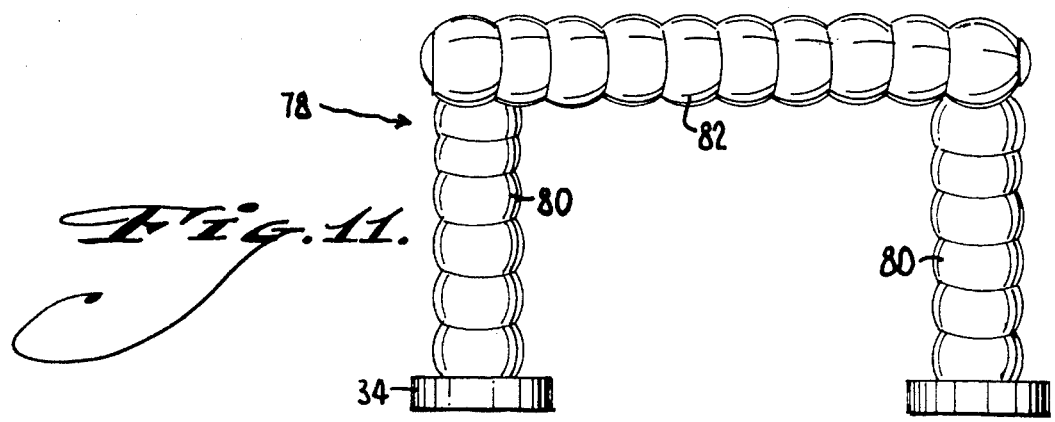
FIG. 11 is a front elevational view thereof.

In FIG. 9b, the central segment 84 features an alternative outlet 90. The outlet 90 is elongated and covered with a porous membrane 92. The porous membrane 92 has two main advantages. Porous membrane 92 forms a flow restriction to controllably vent or meter the discharged air from within the inflated segments 80–84 to maintain inflation. Porous membrane 92 also acts to enhance mixing of the air and water, and hence maximizes evaporative cooling.

Figure 12:
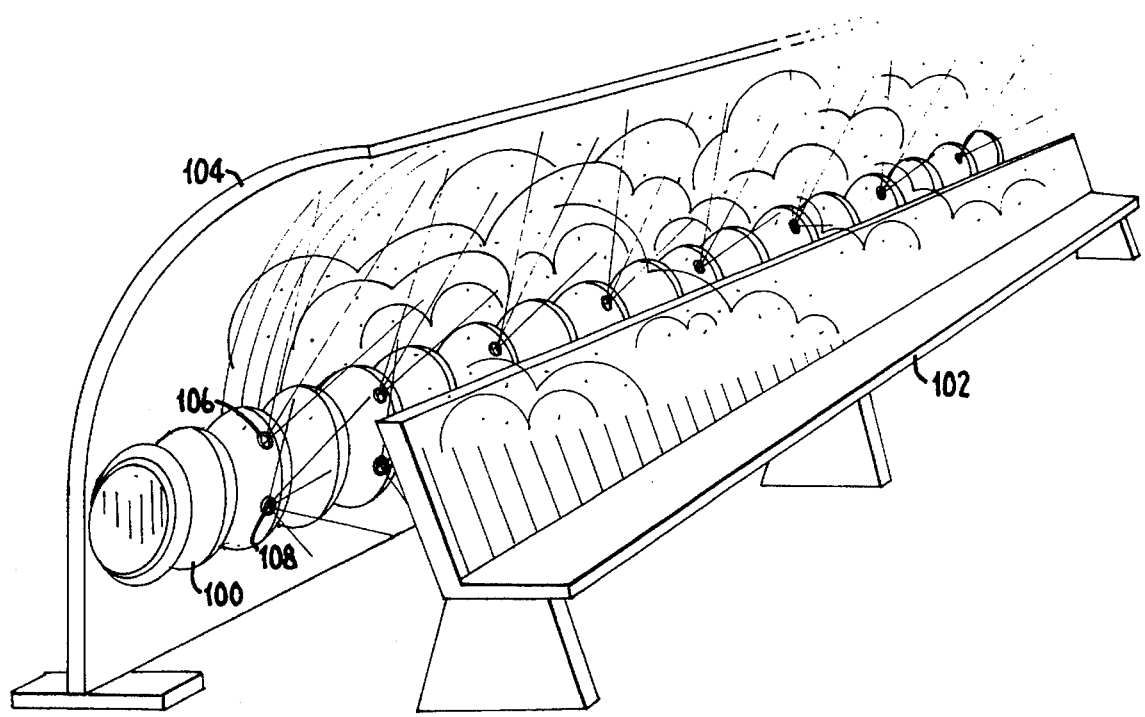
FIG. 12 is a perspective view of yet another embodiment of the invention, with an inflatable pipeline disposed horizontally between a sideline bench and a plexiglas shield; and, FIG. 13 is a side elevational view thereof.
Figure 13:
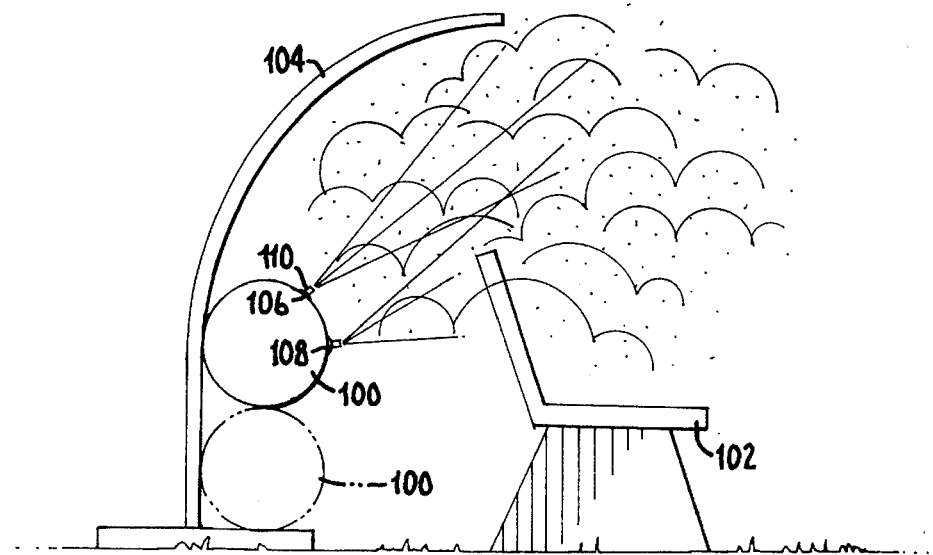

FIGS. 12–13 show another embodiment, wherein a single wall inflatable structure 100 like in FIG. 6 is oriented horizontally. The inflatable structure can be mounted off the ground as shown in solid lines in FIG. 13, or on the ground as shown in broken lines. This embodiment is particularly adapted to cool players on a bench 102 of a soccer contest. The inflatable unit can be placed against or mounted on a plexiglas shield 104 that confines the cooling discharge and also has the advantage of shielding the players against objects thrown from the stands.

Inflatable structure 100 has outlets 106 and 108 aligned in two rows. In the upper row, each outlet 106 is paired with a nozzle 110 as above, for atomizing coolant in the discharged air. In the lower row, the outlets 108 are without a nozzles, and merely exhaust forced air at the ambient temperature. In conjunction with shield 104, the two rows of nozzles 106 and 108 cooperate to lift, carry, and drop the cooled exhaust of the upper row of outlets 106 onto the bench 102. By this arrangement, defined flow patterns can be shaped and selected for the most advantageous cooling in the region of the bench 102.

Alternatively, or in addition, the air in inflatable structure 100 can be pre-cooled via the sprinkling system and porous membrane 62 and 60 shown in FIG. 5.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. An evaporative cooling unit comprising:

an inflatable conduit formed of an inner wall and an outer wall cooperatively defining an inflatable enclosure, the conduit having a chamber with an outlet;

a blower forcing air from an inlet of the chamber to the outlet;

at least one spray nozzle attachable to the inflatable conduit and oriented so as emit a liquid coolant into the air;

means for coupling the spray nozzle to a source of the liquid coolant, whereby mixed air and water are discharged from the outlet such that persons can immerse themselves to cool down.

2. The cooling unit of claim 1, wherein the inner wall and the outer wall form an annular passage and a central passage, one of the annular passage and the central passage forming the enclosure and the other forming the chamber.

3. The cooling unit of claim 2, further comprising a flow divider operable together with the fan to direct a portion of air flow into said enclosure and a portion of air flow into said chamber.

4. The cooling unit of claim 1, further comprising a porous membrane positioned along at least one of the enclosure and the chamber such that air passes through the porous membrane, and wherein at least one said nozzle is positioned to soak the porous membrane with coolant for enhancing evaporative cooling.

5. The cooling unit of claim 1, comprising a plurality of said outlets and a plurality of said nozzles, arranged in nozzle and outlet pairs, a respective nozzle of each pair being mounted to discharge at a corresponding outlet of the pair.

6. The cooling unit of claim 1, wherein one of the inner and outer walls is formed with apertures forming flow restrictions, for metering air discharged from the enclosure to keep the conduit inflated.

7. The cooling unit of claim 3, wherein the flow divider is substantially shaped as a ring, flow through a center of the ring being directed to the chamber and flow around the ring being directed to the enclosure.

8. The cooling unit of claim 1, wherein the conduit defines an inverted-L shape, the outlet being disposed at a free end of the inverted-L shape.

9. An evaporative cooling unit comprising:

an inflatable enclosure formed of flexible material, having at least one inlet and at least one outlet, the enclosure being disposed along an air flow path;

a blower for forcing ambient air from the inlet, through said enclosure to discharge through said outlet;

spray nozzles attachable to the inflatable enclosure, the spray nozzles being arranged to discharge along the flow path;

means for connecting the spray nozzles to a source of water under pressure, whereby the water is mixed with air in the air flow path to cool the air by evaporative cooling, and wherein the outlet is arranged to direct the mixture where persons can immerse themselves to cool down.

10. The cooling unit of claim 9, wherein the enclosure comprises a plurality of segments, including leg segments and overhead segments, cooperatively defining a frame structure, the overhead segments having a plurality of said outlets.

11. The cooling unit of claim 10, wherein at least some of the nozzles are mounted within the segments upstream of the outlets along the air flow path, for mixing before discharge through the outlets, and further comprising porous membranes covering at least some of the outlets, the porous membranes providing flow restrictions for keeping the unit inflated.

12. The cooling unit of claim 10, wherein at least some of the nozzles are paired with outlets, in nozzle and outlet pairs, the nozzle of each pair being mounted to discharge at the outlet of the pair.

13. The cooling unit of claim 10, wherein the frame structure comprises more than two leg segments and more than two overhead segments.

14. An evaporative cooling unit comprising:

an inflatable enclosure formed of thin flexible material and defining a tower;

a blower for forcing ambient air into said enclosure;

spray nozzles attachable adjacent to an upper portion of the tower and being directed at least partly outwardly such that persons can immerse themselves to cool down.

15. An evaporative cooling unit comprising:

a conduit defining at least one outlet;

a blower for forcing ambient air from an inlet into said conduit to exhaust through said outlet and producing an air flow;

spray nozzles attachable to the conduit;

means for connecting the spray nozzles to a source of liquid coolant, the spray nozzles discharging into the air flow such that the coolant is mixed in with the air flow and cools the air flow by evaporative cooling, the outlet being arranged to direct the mixture where persons can immerse themselves to cool down;

wherein the conduit is one of a rigid conduit and a partially sealed enclosure formed of thin flexible material which enclosure of flexible material, for use, has an inflated position induced by the blower forcing air into the enclosure and a deflated position for portability and storage.

16. The cooling unit of claim 15, further comprising at least one porous membrane positioned to intersect the air flow such that air passes through the porous membrane, and wherein at least some of the nozzles are arranged to soak the porous membrane with the coolant.

17. The cooling unit of claim 15, wherein at least some of the nozzles are mounted in the conduit upstream of the outlet along the air flow, whereby the coolant is mixed with the air flow internally of the cooling unit.

* * * * *